United States Patent
Yadav et al.

(10) Patent No.: US 11,144,542 B2
(45) Date of Patent: Oct. 12, 2021

(54) NATURAL LANGUAGE PROCESSING SYSTEM

(71) Applicant: Visa International Service Association, San Francisco, CA (US)

(72) Inventors: Abhishek Parasnath Yadav, Bangalore (IN); Rahul Singhal, Bangalore (IN); Alok Yadav, Singapore (SG); Rajesh Hanumakonda, Bangalore (IN)

(73) Assignee: Visa International Service Association, San Francisco, CA (US)

(*) Notice: Subject to any disclaimer, the term of this patent is extended or adjusted under 35 U.S.C. 154(b) by 286 days.

(21) Appl. No.: 16/177,869

(22) Filed: Nov. 1, 2018

(65) Prior Publication Data

US 2020/0142889 A1 May 7, 2020

(51) Int. Cl.
*G06F 16/24* (2019.01)
*G06F 16/242* (2019.01)
*G06Q 10/10* (2012.01)
*G06F 16/2457* (2019.01)
*G06F 16/9035* (2019.01)
*G06F 40/30* (2020.01)

(52) U.S. Cl.
CPC ...... *G06F 16/243* (2019.01); *G06F 16/24578* (2019.01); *G06F 16/9035* (2019.01); *G06F 40/30* (2020.01); *G06Q 10/1095* (2013.01)

(58) Field of Classification Search
None
See application file for complete search history.

(56) References Cited

U.S. PATENT DOCUMENTS

| | | | |
|---|---|---|---|
| 6,134,532 A | 10/2000 | Lazarus et al. | |
| 6,460,036 B1* | 10/2002 | Herz | G06Q 30/02 707/748 |
| 6,795,808 B1* | 9/2004 | Strubbe | G10L 15/1822 704/275 |
| 9,984,062 B1* | 5/2018 | Strope | G06F 16/35 |
| 10,891,673 B1* | 1/2021 | Sawaf | G06F 16/3344 |
| 2003/0088562 A1 | 5/2003 | Dillon et al. | |

(Continued)

OTHER PUBLICATIONS

De Boom et al., "Representation learning for very short texts using weighted word embedding aggregation", Elsevier, Jul. 2, 2016, 6 pages.

(Continued)

*Primary Examiner* — Neeraj Sharma
(74) *Attorney, Agent, or Firm* — The Webb Law Firm

(57) ABSTRACT

Provided is a natural language processing system for determining a merchant based on a natural language query. The system may include a processor to receive a natural language query, convert at least one word of the natural language query to a vector using at least one neural network to form a set of vectors, determine a vector distance from the set of vectors to each profile in a set of profiles, rank the set of profiles based on the vector distance of each profile to the set of vectors, communicate merchant data associated with at least one merchant included in the set of profiles to the user device, receive a selection of a first merchant associated with the merchant data from the user device, and schedule an appointment with the first merchant for a user of the user device. A computer program product and method are also disclosed.

17 Claims, 7 Drawing Sheets

(56) References Cited

U.S. PATENT DOCUMENTS

| | | | |
|---|---|---|---|
| 2014/0136259 A1 | 5/2014 | Kinsey et al. | |
| 2016/0239847 A1 | 8/2016 | Arvapally et al. | |
| 2017/0109357 A1 | 4/2017 | Gupta et al. | |
| 2017/0177703 A1* | 6/2017 | Liu | G06F 16/2237 |
| 2017/0177712 A1* | 6/2017 | Kopru | G06F 16/3337 |
| 2017/0243112 A1* | 8/2017 | Ekambaram | G06N 3/0454 |
| 2018/0032305 A1 | 2/2018 | Cameron et al. | |
| 2018/0068031 A1* | 3/2018 | Hewavitharana | G06F 16/90328 |
| 2018/0277124 A1* | 9/2018 | Moreno | G10L 17/24 |
| 2019/0197398 A1* | 6/2019 | Jamali | G06N 3/08 |
| 2019/0325863 A1* | 10/2019 | Martin | G06F 16/248 |
| 2019/0340945 A1* | 11/2019 | Malhotra | G06N 5/022 |
| 2020/0013106 A1* | 1/2020 | Chavoshi | G06N 5/04 |
| 2020/0105272 A1* | 4/2020 | Wu | G06N 3/08 |
| 2020/0250732 A1* | 8/2020 | Yu | G06F 40/284 |

OTHER PUBLICATIONS

Le et al., "Distributed Representations of Sentences and Documents", Proceedings of the 31st International Conference on Machine Learning, Beijing, China, 2014, 9 pages.

Narkhede, "Sentence2Vec: Evaluation of popular theories—Part I (Simple average of word vectors)", May 30, 2017, https://medium.com/@premrajnarkhede/sentence2vec-evaluation-of-popular-theories-part-i-simple-average-of-word-vectors-3399f1183afe, 6 pages.

"Semantic Averaging of Documents Using Word2Vec Representations", IMRSV Data Labs, 2017, https://imrsv.ai/blog/2017/5/12/semantic-averaging-of-documents-using-word2vec-representations, 10 pages.

* cited by examiner

NATURAL LANGUAGE PROCESSING SYSTEM

BACKGROUND OF THE INVENTION

1. Field of the Invention

This invention relates generally to systems, devices, products, apparatus, and methods that are used for determining information based on a natural language query and, in one particular embodiment, to a system, product, and method for determining a merchant based on a natural language query.

2. Technical Considerations

Natural language processing may refer to an area of computer science concerned with the interactions between computers and a natural language (e.g., a human language). For example, natural language processing may include methods of how to program computers to process and analyze large amounts of natural language data associated with the natural language.

A chat service may include (e.g., a chatbot, a talkbot, a chatterbot, a Bot, an instant messaging IM bot, an interactive agent, an artificial conversational entity, and/or the like) and may include a computing device implementing a software application that conducts a conversation via an auditory method and/or a textual method. For example, the chat service may include a computing device implementing a software application that is designed to convincingly simulate how a human would behave as a conversational partner. In some examples, a chat service may be used in a dialog system for various purposes, such as customer service or information acquisition.

However, a chat service may rely on a human to interact with a user of the chat service at some point. For example, in the event that a user of the chat service may desire to interact with a merchant based on a session of a chat service, a human associated with the chat service may be required to take an action to allow the user to interact with the merchant.

SUMMARY OF THE INVENTION

Accordingly, systems, devices, products, apparatus, and/or methods for classifying service request messages are disclosed that overcome some or all of the deficiencies of the prior art.

According to a non-limiting embodiment, provided is a natural language processing (NLP) system for determining a merchant based on a natural language query, comprising: at least one processor programmed or configured to: receive a natural language query from a user device, the natural language query comprising at least one word; convert the at least one word of the natural language query to a vector using at least one neural network to form a set of vectors; determine a vector distance from the set of vectors to each profile in a set of profiles, each profile associated with a merchant; rank each profile in the set of profiles based on the vector distance of each profile to the set of vectors; communicate merchant data associated with at least one merchant included in the set of profiles to the user device, wherein the merchant data is based on the rank of the set of profiles; receive a selection of a first merchant associated with the merchant data from the user device; and schedule an appointment with the first merchant for a user of the user device.

According to another non-limiting embodiment, provided is a computer program product for determining a merchant based on a natural language query, the computer program product comprising at least one non-transitory computer-readable medium including one or more instructions that, when executed by at least one processor, cause the at least one processor to: receive a natural language query from a user device, the natural language query comprising at least one word; convert the at least one word of the natural language query to a vector using at least one neural network to form a set of vectors; determine a vector distance from the set of vectors to each profile in a set of profiles, each profile associated with a merchant; rank each profile in the set of profiles based on the vector distance of each profile to the set of vectors; communicate merchant data associated with at least one merchant included in the set of profiles to the user device, wherein the merchant data is based on the rank of the set of profiles; receive a selection of a first merchant associated with the merchant data from the user device; and schedule an appointment with the first merchant for a user of the user device.

According to another non-limiting embodiment, provided is method for determining a merchant based on a natural language query, comprising: receiving, with at least one processor, a natural language query from a user device, the natural language query comprising at least one word; converting, with the at least one processor, the at least one word of the natural language query to a vector using at least one neural network to form a set of vectors; determining, with the at least one processor, a vector distance from the set of vectors to each profile in a set of profiles, each profile associated with a merchant; ranking, with the at least one processor, each profile in the set of profiles based on the vector distance of each profile to the set of vectors; communicating, with the at least one processor, merchant data associated with each merchant included in the set of profiles to the user device, wherein the merchant data is communicated based on ranking each profile in the set of profiles; receiving, with the at least one processor, a selection of a first merchant associated with the merchant data from the user device; and scheduling, with the at least one processor, an appointment with the first merchant for a user of the user device.

Clause 1: A natural language processing (NLP) system for determining a merchant based on a natural language query, comprising: at least one processor programmed or configured to: receive a natural language query from a user device, the natural language query comprising at least one word; convert the at least one word of the natural language query to a vector using at least one neural network to form a set of vectors; determine a vector distance from the set of vectors to each profile in a set of profiles, each profile associated with a merchant; rank each profile in the set of profiles based on the vector distance of each profile to the set of vectors; communicate merchant data associated with at least one merchant included in the set of profiles to the user device, wherein the merchant data is based on the rank of the set of profiles; receive a selection of a first merchant associated with the merchant data from the user device; and schedule an appointment with the first merchant for a user of the user device.

Clause 2: The NLP system of clause 1, wherein, when receiving the natural language query, the at least one processor is programmed or configured to: receive the natural language query from a chat client on the user device.

Clause 3: The NLP system of clauses 1 or 2, wherein, when communicating the merchant data associated with each merchant included in the set of profiles, the at least one processor is programmed or configured to: communicate a message to the chat client on the user device, the message comprising a list of each merchant associated with a subset of the set of profiles based on the ranking of each profile.

Clause 4: The NLP system of any of clauses 1-3, wherein the at least one word of the natural language query is at least one first word, wherein the set of vectors is a first set of vectors, wherein each profile in the set of profiles comprises data associated with the merchant, the data associated with the merchant comprising at least one second word, wherein each profile is associated with a second set of vectors comprising at least one second vector associated with the at least one second word, and wherein, when determining the vector distance from the first set of vectors to each profile in the set of profiles, the at least one processor is programmed or configured to: determine the vector distance from the first set of vectors to each profile in the set of profiles based on a Euclidean distance from the at least one first vector of the first set of vectors to the at least one second vector of the second set of vectors.

Clause 5: The NLP system of any of clauses 1-4, wherein the vector distance comprises a minimum transformation cost to transform each vector of the first set of vectors to each vector of the second set of vectors according to the formula:

$$\min_{T \geq 0} \sum_{i=1}^{n} \sum_{j=1}^{n} T_{ij} c(i, j)$$

$$\text{Subject to: } \sum_{j=1}^{n} T_{ij} = W_{1i}.$$

where $T_{ij}$ is a transformation cost function of the Euclidean distance, $c(i, j)$, between a vector i in the first set of vectors to a corresponding vector j in the second set of vectors, and where $W_{1i}$ is the weight of vector i in the first set of vectors.

Clause 6: The NLP system of any of clauses 1-5, wherein, when ranking each profile in the set of profiles, the at least one processor is programmed or configured to: rank the profiles in the set of profiles based on at least one of: a distance of a location of a merchant associated with a profile from the user device; an offer being provided by a merchant associated with a profile; a review rating of a merchant associated with a profile; a size of a merchant associated with a profile; or any combination thereof.

Clause 7: The NLP system of any of clauses 1-6, further comprising: determining a subset of the set of profiles based on the vector distance of each of the profiles to the set of vectors, wherein, when communicating the merchant data associated with each merchant included in the set of profiles to the user device, the at least one processor is programmed or configured to: communicate the merchant data associated with each merchant included in the subset of profiles to the user device.

Clause 8: A computer program product for determining a merchant based on a natural language query, the computer program product comprising at least one non-transitory computer-readable medium including one or more instructions that, when executed by at least one processor, cause the at least one processor to: receive a natural language query from a user device, the natural language query comprising at least one word; convert the at least one word of the natural language query to a vector using at least one neural network to form a set of vectors; determine a vector distance from the set of vectors to each profile in a set of profiles, each profile associated with a merchant; rank each profile in the set of profiles based on the vector distance of each profile to the set of vectors; communicate merchant data associated with at least one merchant included in the set of profiles to the user device, wherein the merchant data is based on the rank of the set of profiles; receive a selection of a first merchant associated with the merchant data from the user device; and schedule an appointment with the first merchant for a user of the user device.

Clause 9: The computer program product of clause 8, wherein the one or more instructions that cause the at least one processor to receive the natural language query, cause the at least one processor to: receive the natural language query from a chat client on the user device.

Clause 10: The computer program product of clauses 8 or 9, wherein the one or more instructions that cause the at least one processor to communicate the merchant data associated with the merchant included in the set of profiles, cause the at least one processor to: communicate a message to the chat client on the user device, the message comprising a list of each merchant associated with a subset of the set of profiles based on the ranking of each profile.

Clause 11: The computer program product of any of clauses 8-10, wherein the at least one word of the natural language query is at least one first word, wherein the set of vectors is a first set of vectors, wherein each profile in the set of profiles comprises data associated with the merchant, the data associated with the merchant comprising at least one second word, wherein each profile is associated with a second set of vectors comprising at least one second vector associated with the at least one second word, and wherein the one or more instructions that cause the at least one processor to determine the vector distance from the first set of vectors to each profile in the set of profiles, cause the at least one processor to: determine the vector distance from the first set of vectors to each profile in the set of profiles based on a Euclidean distance from at least one first vector of the first set of vectors to the at least one second vector of the second set of vectors.

Clause 12: The computer program product of any of clauses 8-11, wherein the vector distance comprises a minimum transformation cost to transform each vector of the first set of vectors to each vector of the second set of vectors according to the formula:

$$\min_{T \geq 0} \sum_{i=1}^{n} \sum_{j=1}^{n} T_{ij} c(i, j)$$

$$\text{Subject to: } \sum_{j=1}^{n} T_{ij} = W_{1i}.$$

where $T_{ij}$ is a transformation cost function of the Euclidean distance, $c(i, j)$, between a vector i in the first set of vectors to a corresponding vector j in the second set of vectors, and where $W_{1i}$ is the weight of vector i in the first set of vectors.

Clause 13: The computer program product of any of clauses 8-12, wherein the one or more instructions that cause the at least one processor to rank each profile in the set of profiles, cause the at least one processor to: rank the profiles in the set of profiles based on at least one of: a distance of a location of a merchant associated with a profile from the user device; an offer being provided by a merchant associated with a profile; a review rating of a merchant associated with a profile; a size of a merchant associated with a profile; or any combination thereof.

Clause 14: The computer program product of any of clauses 8-13, further comprising: determining a subset of the set of profiles based on the vector distance of each of the profiles to the set of vectors, wherein, when communicating the merchant data associated with each merchant included in the set of profiles to the user device, the at least one processor is programmed or configured to: communicate the merchant data associated with each merchant included in the subset of profiles to the user device Clause 15: A method for determining a merchant based on a natural language query, comprising: receiving, with at least one processor, a natural language query from a user device, the natural language query comprising at least one word; converting, with the at least one processor, the at least one word of the natural language query to a vector using at least one neural network to form a set of vectors; determining, with the at least one processor, a vector distance from the set of vectors to each profile in a set of profiles, each profile associated with a merchant; ranking, with the at least one processor, each profile in the set of profiles based on the vector distance of each profile to the set of vectors; communicating, with the at least one processor, merchant data associated with each merchant included in the set of profiles to the user device, wherein the merchant data is communicated based on ranking of the set of profiles; receiving, with the at least one processor, a selection of a first merchant associated with the merchant data from the user device; and scheduling, with the at least one processor, an appointment with the first merchant for a user of the user device.

Clause 16: The method of clause 15, wherein the at least one word of the natural language query is at least one first word, wherein the set of vectors is a first set of vectors, wherein each profile in the set of profiles comprises a description of the merchant, the data associated with the merchant comprising at least one second word, wherein each profile is associated with a second set of vectors comprising at least one second vector associated with the at least one second word, and wherein determining the vector distance from the first set of vectors to each profile in the set of profiles comprises: determining the vector distance from the first set of vectors to each profile in the set of profiles based on a Euclidean distance from at least one first vector of the first set of vectors to the at least one second vector of the second set of vectors.

Clause 17: The method of clauses 15 or 16, wherein the vector distance comprises a minimum transformation cost to transform each vector of the first set of vectors to each vector of the second set of vectors according to the formula:

$$\underset{T \geq 0}{\text{Min}} \sum_{i=1}^{n} \sum_{j=1}^{n} T_{ij} c(i, j)$$

$$\text{Subject to: } \sum_{j=1}^{n} T_{ij} = W_{1i}.$$

where $T_{ij}$ is a transformation cost function of the Euclidean distance, $c(i, j)$, between a vector i in the first set of vectors to a corresponding vector j in the second set of vectors, and where $W_{1i}$ is the weight of vector i in the first set of vectors.

Clause 18: The method of any of clauses 15-17, further comprising: training the neural network based on a second set of profiles before converting the at least one word of the natural language query.

Clause 19: The method of any of clauses 15-18, wherein the neural network comprises a skip-gram model with an input layer, an output layer, and at least one hidden layer connecting the input layer to the output layer, and wherein training the neural network comprises: iteratively providing a third word of the second set of profiles to the input layer; and comparing outputs of the output layer to a plurality of words of the second set of profiles, wherein the plurality of words are adjacent the third word.

Clause 20: The method of any of clauses 15-19, further comprising: initiating a payment transaction between the merchant and the user of the user device before scheduling the appointment; receiving user data associated with the user from the user device, the user data comprising user identification data associated with an identification of the user and account identification data associated with an account identifier of a payment account of the user; and storing a profile associated with the user of the user device based on the user data, wherein initiating the payment transaction comprises: communicating the account identification data from the profile and merchant identification data associated with the merchant to a transaction service provider system to authorize the payment transaction; and receiving an indication from the transaction service provider system that the payment transaction is authorized.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE INVENTION

Figure 1:
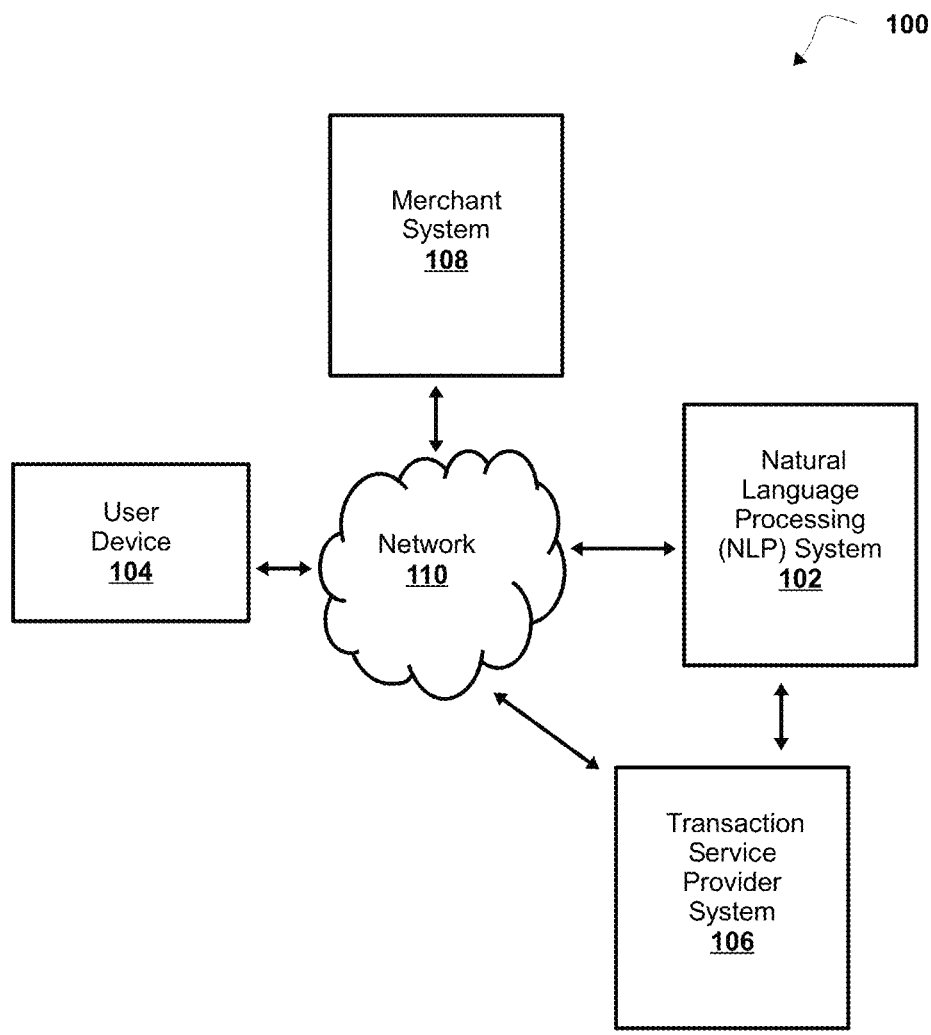
FIG. 1 is a diagram of a non-limiting embodiment of an environment in which systems, devices, products, apparatus, and/or methods, described herein, may be implemented according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "communicate" may refer to the reception, receipt, transmission, transfer, provision, and/or the like of information (e.g., data, signals, messages, instructions, commands, and/or the like). As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments, a message may refer to a packet (e.g., a data packet, a network packet, and/or the like) that includes data.

As used herein, the terms "issuer institution," "portable financial device issuer," "issuer," or "issuer bank" may refer to one or more entities that provide one or more accounts to a user (e.g., customer, consumer, and/or the like) for conducting transactions (e.g., payment transactions), such as initiating credit card payment transactions, debit card payment transactions, and/or prepaid card payment transactions. For example, an issuer institution may provide an account identifier, such as a primary account number (PAN), to a user that uniquely identifies one or more accounts associated with that user. The account identifier may be embodied on a portable financial device, such as a physical financial instrument (e.g., a payment card) and/or may be electronic and used for electronic payments. In some non-limiting embodiments, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes. An issuer institution may be associated with a bank identification number (BIN) that uniquely identifies it.

As used herein, the term "account identifier" may include one or more types of identifiers associated with a user account (e.g., a PAN, a primary account number, a card number, a payment card number, a token, and/or the like). In some non-limiting embodiments, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a token that maps to a PAN or other type of identifier. Account identifiers may be alphanumeric, any combination of characters and/or symbols, and/or the like.

As used herein, the term "token" may refer to an identifier that is used as a substitute or replacement identifier for an account identifier, such as a PAN. Tokens may be associated with a PAN or other account identifiers in one or more data structures such that they can be used to conduct a transaction without directly using the account identifier, such as a PAN. In some examples, an account identifier, such as a PAN, may be associated with a plurality of tokens for different uses or different purposes.

As used herein, the term "merchant" may refer to one or more entities (e.g., operators of retail businesses that provides goods and/or services, and/or access to goods and/or services, to a user (e.g., a customer, a consumer, a customer of the merchant, and/or the like) based on a transaction, such as a payment transaction. As used herein, "merchant system" may refer to one or more computer systems operated by or on behalf of a merchant, such as a server computer executing one or more software applications. As used herein, a "merchant point-of-sale (POS) system" may refer to one or more computers and/or peripheral devices used by a merchant to engage in payment transactions with customers, including one or more card readers, near-field communication (NFC) receivers, radio frequency identification (RFID) receivers, matrix barcode readers (e.g., quick response (QR) code readers), and/or other contactless transceivers or receivers, contact-based receivers, payment terminals, computers, servers, input devices, and/or other like devices that may be used to initiate a payment transaction. A merchant POS system may also include one or more server computers programmed or configured to process online payment transactions through webpages, mobile applications, and/or the like. As used herein, the term "product" may refer to one or more goods and/or services offered by a merchant.

As used herein, a "point-of-sale (POS) system" may refer to one or more computers and/or peripheral devices used by a merchant to engage in payment transactions with customers, including one or more card readers, NFC receivers, RFID receivers, matrix barcode readers (e.g., quick response (QR) code readers), and/or other contactless transceivers or receivers, contact-based receivers, payment terminals, computers, servers, input devices, and/or other like devices that may be used to initiate a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer. For example, a transaction service provider may include a payment network, such as Visa®, MasterCard®, American Express®, or any other entity that processes transactions. As used herein, the term "transaction service provider system" may refer to one or more systems operated by or operated on behalf of a transaction service provider, such as a transaction service provider system executing one or more software applications associated with the transaction service provider. In some non-limiting embodiments, a transaction service provider system may include one or more servers operated by or operated on behalf of a transaction service provider.

As used herein, the term "portable financial device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, as examples. The portable financial device may include volatile or non-volatile memory to store information (e.g., an account identifier, a name of the account holder, and/or the like).

As used herein, the term "client device" may refer to one or more devices (e.g., client-side devices) or one or more systems (e.g., client-side systems), which are remote from a server, used to access a functionality provided by the server. For example, a client device may include one or more computing devices (e.g., one or more computing machines, one or more computers, one or more processors, one or more information processing systems, and/or the like), cellular phones, smartphones, wearable devices (e.g., watches, glasses, lenses, clothing, and/or the like), personal digital assistants (PDAs), and/or the like.

As used herein, the term "server" may refer to one or more devices that provide a functionality to one or more devices (e.g., one or more client devices) via a network (e.g., a public network, a private network, the Internet, and/or the like). For example, a server may include one or more computing devices.

As used herein, the term "system" may refer to one or more devices that are connected or are configured to be connected with one or more other devices. For example, a system may include a plurality of computing devices that include software applications, where the plurality of computing devices are connected via a network.

In some non-limiting embodiments, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments of the present invention are directed to systems, methods, and computer program products for determining a merchant based on a natural language query. In some non-limiting embodiments, a natural language processing (NLP) system may include at least one processor programmed or configured to receive a natural language query from a user device, the natural language query comprising at least one word, convert the at least one word of the natural language query to a vector using at least one neural network to form a set of vectors, determine a vector distance from the set of vectors to each profile in a set of profiles, each profile associated with a merchant, rank each profile in the set of profiles based on the vector distance of each profile to the set of vectors, communicate merchant data associated with at least one merchant included in the set of profiles to the user device, wherein the merchant data is communicated based on the rank of the set of profiles, receive a selection of a first merchant associated with the merchant data from the user device, and causing a resource associated with the first merchant to be reserved based on the selection of the profile. In this way, embodiments of the present invention allow a user to interact with a merchant based on a natural language query without a human being be required to take an action to allow the user to interact with the merchant.

Referring now to FIG. 1, FIG. 1 is a diagram of an example environment 100 in which devices, systems, and/or methods, described herein, may be implemented. As shown in FIG. 1, environment 100 includes natural language processing (NLP) system 102, user device 104, transaction service provider system 106, merchant system 108, and network 110. NLP system 102, user device 104, transaction service provider system 106, and/or merchant system 108 may interconnect (e.g., establish a connection to communicate) via wired connections, wireless connections, or a combination of wired and wireless connections.

NLP system 102 may include one or more devices capable of receiving information from user device 104, transaction service provider system 106, merchant system 108, and/or other devices via network 110, and/or communicating information to user device 104, transaction service provider system 106, merchant system 108, and/or other devices via network 110. For example, NLP system 102 may include one or more computing devices, such as a server (e.g., a transaction processing server), a group of servers, and/or other like devices. In some non-limiting embodiments, NLP system 102 may be associated with a financial institution, a transaction service provider, and/or an issuer as described herein. For example, NLP system 102 may be operated by a financial institution, a transaction service provider, and/or an issuer. In some non-limiting embodiments, NLP system 102 may include transaction service provider system 106. For example, transaction service provider system 106 may be a component of NLP system 102.

User device 104 may include one or more devices capable of receiving information from NLP system 102, transaction service provider system 106, merchant system 108 and/or another device (e.g., another user device 104) via network 110 and/or communicating information to NLP system 102, transaction service provider system 106, merchant system 108 and/or another device (e.g., another user device 104) via network 110. For example, user device 104 may include one or more computing devices, such as one or more servers, one or more routers, one or more modems, one or more client devices (e.g., one or more desktop computers, one or more portable computers, one or more tablet computers, one or more laptop computers, one or more mobile devices such as one or more cellular phones, smartphones, PDAs, and/or the like).

Transaction service provider system 106 may include one or more devices capable of receiving information from NLP system 102, user device 104, and/or merchant system 108 via network 110 and/or communicating information to NLP system 102, user device 104, and/or merchant system 108 via network 110. For example, transaction service provider system 106 may include a computing device, such as a server, a group of servers, and/or other like devices. In some non-limiting embodiments, the transaction service provider system 106 may be associated with an entity (e.g., a transaction service provider) that operates a credit card network and that processes payments for credit accounts, debit accounts, credit cards, debit cards, and/or the like. In some non-limiting embodiments, transaction service provider system 106 may be in communication with a data storage device, which may be local or remote to the transaction service provider system 106. In some non-limiting embodiments, transaction service provider system 106 may be capable of receiving information from, storing information in, communicating information to, or searching information stored in data storage device. In some non-limiting embodiments, transaction service provider system 106 may include NLP system 102. For example, NLP system 102 may be a component of transaction service provider system 106.

Merchant system 108 may include one or more devices capable of receiving information from NLP system 102, user device 104, and/or transaction service provider system 106 via network 110 and/or communicating information to NLP system 102, user device 104, and/or transaction service provider system 106 via network 110. Merchant system 108 may also include a device capable of receiving information from user device 104 via a network 110, a communication connection (e.g., an NFC communication connection, an RFID communication connection, a Bluetooth® communication connection, etc.) with user device 104, and/or the like, and/or communicating information to user device 104 via the network, the communication connection, and/or the like. For example, merchant system 108 may include a computing device, a server, a group of servers, a client device, a group of client devices and/or other like devices. In some non-limiting embodiments, merchant system 108 may include one or more user devices 104. For example, merchant system 108 may include user device 104 that allows a merchant to communicate information to transaction service provider system 106.

Network 110 may include one or more wired and/or wireless networks. For example, network 110 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
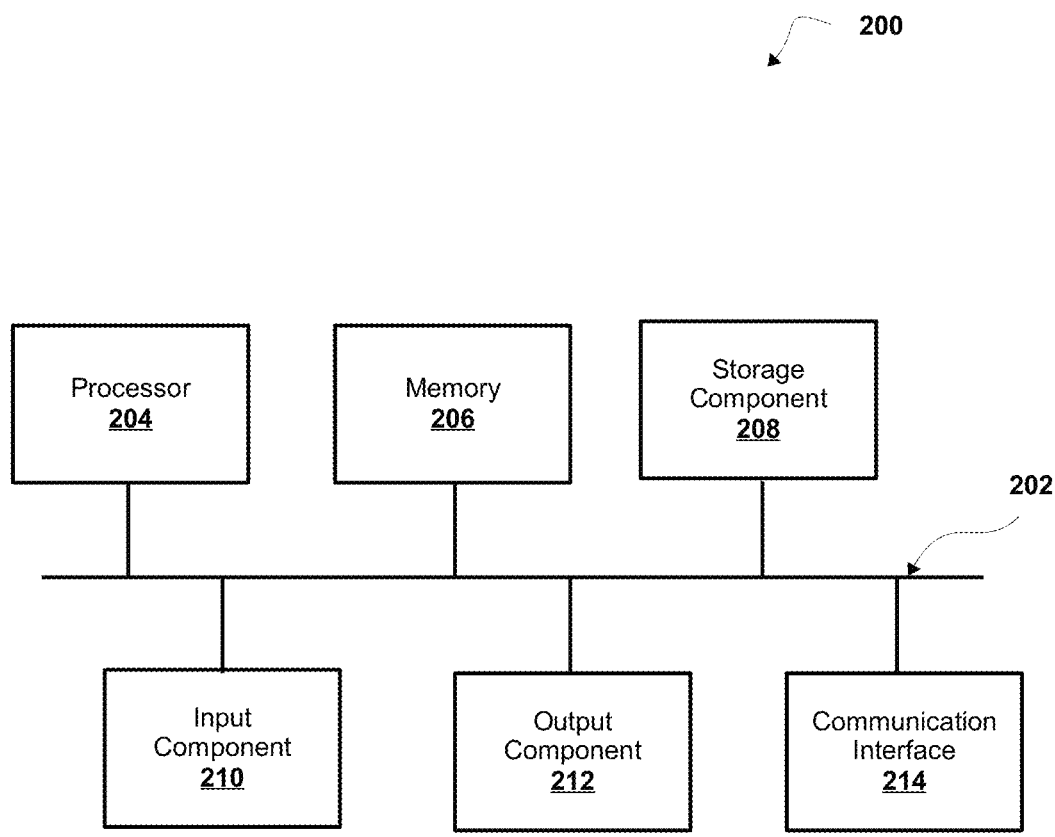
FIG. 2 is a diagram of a non-limiting embodiment of components of one or more devices of FIG. 1.

Referring now to FIG. 2, FIG. 2 is a diagram of example components of a device 200. Device 200 may correspond to NLP system 102, user device 104, transaction service provider system 106, merchant system 108 and/or one or more devices of NLP system 102, one or more devices of transaction service provider system 106, or one or more devices of merchant system 108. In some non-limiting embodiments, NLP system 102, user device 104, transaction service provider system 106, and/or merchant system 108 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
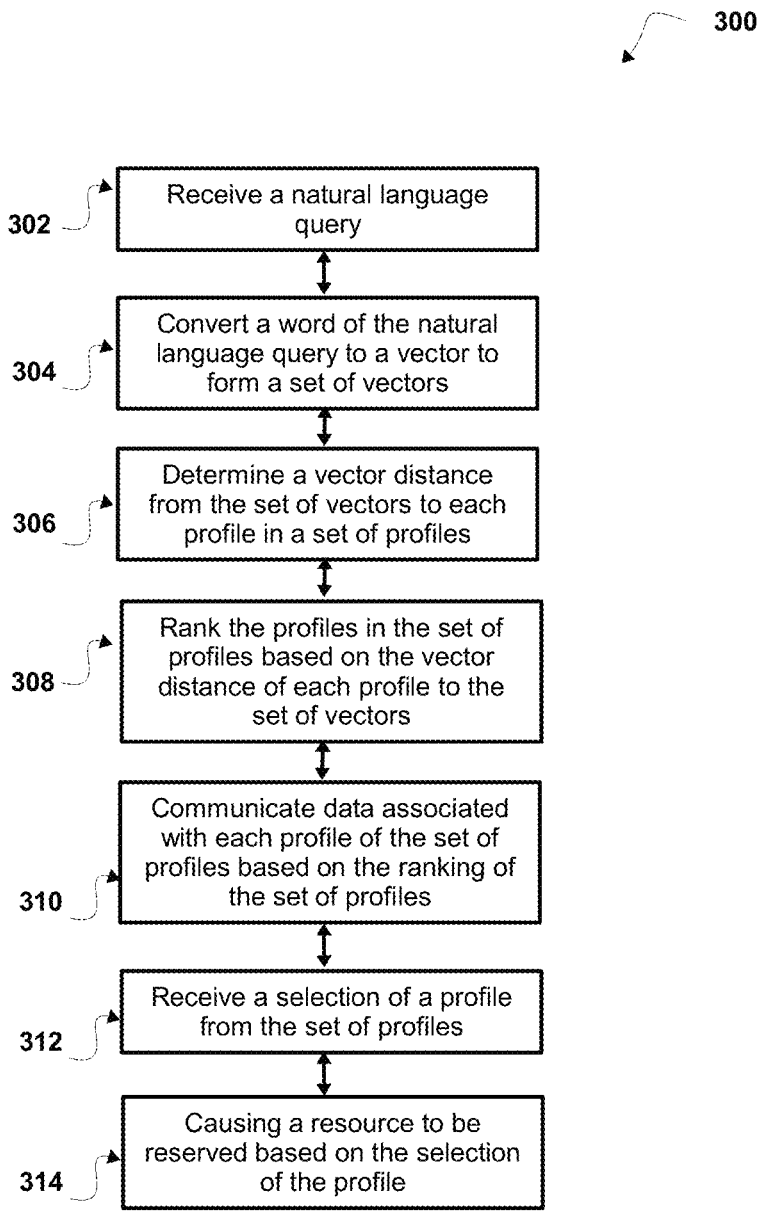
FIG. 3 is a flowchart of a non-limiting embodiment of a process for determining a merchant based on a natural language query.

Referring now to FIG. 3, FIG. 3 is a flowchart of a non-limiting embodiment of a process 300 for determining a merchant based on a natural language query. In some non-limiting embodiments, one or more of the steps of process 300 may be performed (e.g., completely, partially, etc.) by NLP system 102 (e.g., one or more devices of NLP system 102). In some non-limiting embodiments, one or more of the steps of process 300 may be performed (e.g., completely, partially, etc.) by another device or a group of devices separate from or including NLP system 102, such as transaction service provider system 106.

As shown in FIG. 3, at step 302, process 300 includes receiving a natural language query. For example, NLP system 102 may receive a natural language query from a computing device (e.g., user device 104). In some non-limiting embodiments, the natural language query may include text and the text may include one or more words. For example, the natural language query may include text provided by a person (e.g., text provided by a person associated with user device 104, text that includes natural language input by a person associated with user device 104, and/or the like) and/or text that is generated by a computing device (e.g., text that includes machine-generated text, text that include natural language generated by a computing device, and/or the like).

In some non-limiting embodiments, the text may include a plurality of words provided by a person associated with user device 104 that included as part of an input to a chat service (e.g., a chatbot, a talkbot, a chatterbot, a Bot, instant message (IM) bot, interactive agent, and/or the like). For example, the text may include a plurality of words provided by a person associated with user device 104 that included as the input to a chat client of the chat service and the chat client is on user device 104. In some non-limiting embodiments, NLP system 102 may receive the natural language query from a chat client of the chat service on user device 104. In some non-limiting embodiments, the chat service and/or the chat client may be associated with a merchant (e.g., a merchant associated with merchant system 108).

In some non-limiting embodiments, the text may include one or more words associated with a product and/or a service provided by a merchant. For example, the text may include one or more words associated with an identification of a product and/or a service (e.g., a name of a product and/or a service) provided by a merchant, a merchant category (e.g., a merchant category code) of a merchant, a location (e.g., a location of a building, a location of a store, and/or the like) of a merchant, and/or the like.

As further shown in FIG. 3, at step 304, process 300 includes converting a word of the natural language query to a vector to form a set of vectors. For example, NLP system 102 may convert each word of a plurality of words of the natural language query to a vector to form a set of vectors.

In some non-limiting embodiments, NLP system 102 may generate a neural network model to convert one or more words of the natural language query to a vector to form a set of vectors. For example, NLP system 102 may generate a neural network model based on data associated with an input to a chat service (e.g., data associated with text included in a message provided as an input to a chat service, data associated with one or more words of text included in a message provided as an input to a chat service, and/or the like).

In some non-limiting embodiments, the neural network model may be designed to receive, as an input, a natural language query including data associated with an input to a chat service, and provide, as an output, one or more vectors having values that indicate a word as a point in a vector space and words that are semantically similar to the word as points that are nearby in the vector space. For example, the neural network model may receive, as an input, a natural language query that includes a plurality of words associated with a product and/or a service provided by a merchant and the neural network model may provide the output that includes one or more vectors (e.g., a vector, a set of vectors, and/or the like) having values based on the semantic similarity of the plurality of words included in the natural language query to words in one or more profiles associated with one or more merchants.

In some non-limiting embodiments, a profile associated with a merchant may include one or more words associated with the merchant. For example, the one or more words may be associated with a product and/or a service provided by the merchant, a location of the merchant, a summary of the merchant, a review of the merchant provided by a customer of the merchant, a transaction involving the merchant, a transaction amount of payment transactions involving the merchant, and/or the like. In some non-limiting embodiments, the profile may include an electronic document, such as a webpage (e.g., a stored copy of a webpage), a word processor document, an Adobe PDF document, a spreadsheet document, and/or the like.

In some non-limiting embodiments, NLP system 102 may receive the data from user device 104 and/or other devices (e.g., other user devices 104) and provide the data as an input to the neural network model. NLP system 102 may analyze the data to generate the neural network model based on receiving the data. In some non-limiting embodiments, NLP system 102 may generate the neural network model by generating a rule for the neural network model based on the data (e.g., historical data) associated with an input to a chat service. In some non-limiting embodiments, historical data may include data associated with an input to a chat service that was used to determine a merchant.

In some non-limiting embodiments, NLP system 102 may process the data to obtain training data for the neural network model. For example, NLP system 102 may process the data to change the data into a format that may be analyzed (e.g., by NLP system 102) to generate a neural network model. The data that is changed may be referred to as training data. In some non-limiting embodiments, NLP system 102 may process the data to obtain the training data based on receiving the data. Additionally or alternatively, NLP system 102 may process the data to obtain the training data based on NLP system 102 receiving an indication that NLP system 102 is to process the data from a user of NLP system 102, such as when NLP system 102 receives an indication to create a neural network model for a time interval corresponding to the data.

In some non-limiting embodiments, NLP system 102 may train the neural network model based on the training data for the neural network model. For example, NLP system 102 may train the neural network model using the training data before using the neural network model to convert a word of a natural language query (e.g., a natural language query received an input to a chat service) to a vector.

In some non-limiting embodiments, NLP system 102 may validate the neural network model. For example, NLP system 102 may validate the neural network model after NLP system 102 generates the neural network model. In some non-limiting embodiments, NLP system 102 may validate the neural network model based on a portion of the training data to be used for validation. For example, NLP system 102 may partition the training data into a first portion and a second portion, where the first portion may be used to generate the neural network model, as described above. In this example, the second portion of the training data (e.g., the validation data) may be used to validate the neural network model.

In some non-limiting embodiments, NLP system 102 may generate a neural network that includes a skip-gram model. For example, NLP system 102 may generate a neural network that includes a skip-gram model with an input layer, and output layer, and at least one hidden layer connecting the input layer to the output layer. In such an example, training the neural network model may include iteratively providing a word of a set of profiles as an input to the input layer and comparing outputs of the output layer to a plurality of words of the set of profiles adjacent the word.

In some non-limiting embodiments, once the neural network model has been validated, NLP system 102 may further train the neural network model and/or create new neural network models based on receiving new training data. The new training data may include additional data associated with one or more inputs to a chat service.

In some non-limiting embodiments, NLP system 102 may store the neural network model. For example, NLP system 102 may store the neural network model in a data structure (e.g., a database, a linked list, a tree, and/or the like). The data structure may be located within NLP system 102 or external, and possibly remote from, NLP system 102.

In some non-limiting embodiments, NLP system 102 may tokenize one or more words of the natural language search query into one or more tokens and/or one or more words of a profile of the set of profiles into one or more tokens. For example, NLP system 102 may tokenize one or more words of the natural language search query and/or one or more words of a profile of the set of profiles based on receiving the natural language query. In some non-limiting embodiments, NLP system 102 may convert the one or more tokens into a base form by removing inflections. For example, NLP system 102 may convert the one or more tokens into a base form by removing inflections based on tokenizing one or more words. Additionally or alternatively, NLP system 102 may remove punctuation and stop words from the one or more tokens. In some non-limiting embodiments, NLP system 102 may convert the one or more tokens to a vector using the neural network to form a set of one or more vectors. In this way, NLP system 102 can more accurately and more efficiently determine a vector distance between a vector of the set of vectors and a profile of the set of profiles.

As further shown in FIG. 3, at step 306, process 300 includes determining a vector distance from the set of vectors to each profile in a set of profiles. For example, NLP system 102 may determine a vector distance from the set of vectors to each profile in the set of profiles. In some non-limiting embodiments, NLP system 102 may determine the vector distance based on a Euclidean distance from each vector of the set of vectors to each vector of a set of vectors based on one or more words in each of the profiles of the set of profiles. For example, NLP system 102 may determine the vector distance based on the Euclidean distance from each vector of the set of vectors to each vector of a set of vectors based on one or more words in each of the profiles of the set of profiles based on converting one or more words of the natural language query to a vector to form a set of vectors.

In some non-limiting embodiments, the vector distance may include a minimum of a sum of the Euclidean distance from each vector of the set of vectors for one or more words in the natural language query to the each vector of the set of vectors for the set of profiles (e.g., one or more words in a profile, one or more words in each of the profiles of the set of profiles, and/or the like).

In some non-limiting embodiments, NLP system 102 may receive a set of vectors associated with one or more words in each of the profiles of the set of profiles. For example, NLP system 102 may receive the set of vectors associated with one or more words in each of the profiles of the set of profiles from transaction service provider system 106. In some non-limiting embodiments, NLP system 102 may determine a vector distance from the set of vectors to each profile in a set of profiles In some non-limiting embodiments, NLP system 102 may convert each word of each profile to a vector using a neural network to form a set of vectors for the set of profiles. For example, NLP system 102 may convert each word of each profile to a vector using the neural network that was used to convert a word of the natural language query to form a set of vectors for the set of profiles.

As further shown in FIG. 3, at step 308, process 300 includes ranking the profiles in the set of profiles based on the vector distance of each profile to the set of vectors. For example, NLP system 102 may rank the profiles in the set of profiles based on the vector distance of each profile to the set of vectors. In some non-limiting embodiments, NLP system 102 may rank the profiles in the set of profiles based on the vector distance of each profile to a vector of the set of vectors, where the vector corresponds to a predetermined word in the natural language query. For example, NLP system 102 may rank the profiles based on the vector distance of each profile to a vector of the set of vectors, where the vector corresponds to a word associated with a product and/or service provided by a merchant associated with merchant system 108.

In some non-limiting embodiments, NLP system 102 may rank the profiles in the set of profiles based on a threshold value of the vector distance of each profile to the set of vectors. For example, NLP system 102 may rank the profiles in the set of profiles that satisfy the threshold value (e.g., a maximum threshold value, a minimum threshold value, a predetermined threshold value, and/or the like) of the vector distance of each profile to the set of vectors.

In some non-limiting embodiments, NLP system 102 may rank the profiles in the set of profiles based on a parameter associated with a merchant. For example, NLP system 102 may rank the profiles in the set of profiles based on at least one of a product and/or service provided by a merchant that is relevant to a user of user device 104, a distance of a location of a merchant associated with a profile from user device 104 (e.g., a shortest distance of a location of a merchant associated with a profile from user device 104, a longest distance of a location of a merchant associated with a profile from user device 104, a distance of a location of a merchant associated with a profile from user device 104 that allows user device 104 to travel a route, and/or the like), an offer being provided by a merchant associated with a profile, a review rating of a merchant associated with a profile, a size of a merchant associated with a profile, a proficiency of a merchant associated with a profile, a product and/or a service, of a merchant associated with a profile, or any combination thereof.

As further shown in FIG. 3, at step 310, process 300 includes communicating data associated with each profile of the set of profiles based on the ranking of the set of profiles. For example, NLP system 102 may communicate data associated with a profile of the set of profiles in the order of the ranking of the set of profiles to user device 104. In some non-limiting embodiments, the data associated with a profile may include merchant data associated with a merchant on which the profile is based. For example, the data associated with a profile may include product data associated with a product provided by a merchant (e.g., a name of the product, a name of a type of product, a stock keeping unit (SKU) number associated with a product, a merchant code associated with a product, and/or the like), service data associated with a service provided by a merchant (e.g., a name of the service, a name of a type of service, a stock keeping unit (SKU) number associated with a service, a merchant code associated with a service, and/or the like), identification data associated with an identity of the merchant (e.g., a unique identifier of the merchant, a name of the merchant, and/or the like), merchant category data associated with a merchant category of the merchant (e.g., a code for a merchant category, a name of a merchant category, a type of a merchant category, and/or the like), merchant account data associated with a merchant account of the merchant (e.g., an account identifier associated with an account of the merchant, an account identifier associated with an account of the merchant provided by an acquirer associated with an acquirer system, a PAN associated with an account of the merchant, a token associated with an account of the merchant, and/or the like), availability data associated with an availability of a resource (e.g., a product and/or a service) provided by the merchant, and/or the like.

In some non-limiting embodiments, NLP system 102 may communicate data associated with a plurality of profiles of the set of profiles. For example, NLP system 102 may determine a subset of the set of profiles based on the vector distance of each of the profiles to the set of vectors, such as the set of vectors of a user query, the set of vectors of a natural language query received from user device 104, and/or the like, and NLP system 102 may communicate the data associated with each merchant included in the subset of profiles to user device 104.

In some non-limiting embodiments, NLP system 102 may communicate a message that includes data associated with a profile of the set of profiles. For example, NLP system 102 may communicate a message that includes data associated with a profile of the set of profiles to the chat client on user device 104. In some non-limiting embodiments, the message may include a list of each merchant associated with one or more profiles (e.g., a subset) of the set of profiles based on a ranking of each profile.

As further shown in FIG. 3, at step 312, process 300 includes receiving a selection of a profile from the set of profiles. For example, NLP system 102 may receive a selection of a profile from the set of profiles. In some non-limiting embodiments, NLP system 102 may receive the selection of the profile from the set of profiles from user device 104. For example, NLP system 102 may receive the selection from user device 104 based on (and/or in response to) a user of user device 104 inputting the selection into user device 104.

In some non-limiting embodiments, the user of user device 104 may input the selection in response to a prompt from NLP system 102. For example, user device 104 may display (e.g., list) information related to the set of profiles (or a subset thereof). Additionally or alternatively, the information related to the set of profiles (or a subset thereof) may be included in a message provided (e.g., as output) from a chat service on user device 104. For example, the message may include text providing information related to the set of profiles (or a subset thereof).

In some non-limiting embodiments, each profile may be associated with a merchant. Additionally or alternatively, user device 104 may display information related to each merchant associated with the set of profiles (or a subset thereof). For example, NLP system 102 may communicate a message to a chat client on user device 104. In some non-limiting embodiments, the message may include a list of each merchant associated with a subset of the set of profiles based on the ranking of each profile. For example, the message may include a list of a subset of the merchants (e.g., ten merchants) associated with a subset of the set of profiles (e.g., ten profiles) with the highest rank. Additionally or alternatively, the subset of merchants may be listed in the message in order of rank. In some non-limiting embodiments, the user may input the selection by inputting text into the chat service on user device 104. For example, the user may input the name (or other identifying information) of one or more of the merchants into the chat service using user device 104. Additionally or alternatively, if the list of merchants is numbered, the user may input the number(s) associated with one or more of the merchants into the chat client of user device 104.

As further shown in FIG. 3, at step 314, process 300 includes causing a resource to be reserved based on the selection of the profile. For example, NLP system 102 may cause a resource associated with merchant system 108 to be reserved based on the selection of the profile. In some non-limiting embodiments, NLP system 102 may cause an appointment to be scheduled in merchant system 108 (e.g., the resource may be the time period associated with the appointment). Additionally or alternatively, NLP system 102 may cause some service provided by the merchant to be reserved by merchant system 108. For example, the service may be reserved during a time period (e.g., the time period associated with the appointment). Additionally or alternatively, NLP system 102 may cause some good, equipment, furniture, place, room, physical object, and/or the like of the merchant to be reserved by merchant system 108. For example, such resources may be reserved during a time period (e.g., the time period associated with the appointment).

In some non-limiting embodiments, NLP system 102 may communicate a message (e.g., request) to reserve the resource (e.g., schedule the appointment) to merchant system 108. In some non-limiting embodiments, the message (e.g., request) from NLP system 102 may include one or more time periods during which the resource is desired to be reserved. Additionally or alternatively, the message (e.g., request) from NLP system 102 may include user identification data associated with an identification of the user of user device 104. Additionally or alternatively, the message (e.g., request) from NLP system 102 may include other user data (e.g., user contact data associated with contact information for the user, account identification data associated with an account identifier of a payment account of the user, and/or the like).

In some non-limiting embodiments, NLP system 102 may receive a message (e.g., response) from merchant system 108. For example, the message (e.g., response) from merchant system 108 may indicate that the appointment has been scheduled. Additionally or alternatively, the message (e.g., response) may include one or more time periods (or alternative time periods) during which the resource is available to be reserved. In some non-limiting embodiments, NLP system 102 may communicate to user device 104 the time periods (or alternative time periods) during which the resource is available to be reserved from merchant system 108. For example, text associated with such time periods may be communicated to a chat service on user device 104, which may display such text to the user as described herein. Additionally or alternatively, NLP system 102 may receive a selection of one of the one or more time periods from user device 104. For example, NLP system 102 may receive the selection of the time period from user device 104 based on input by the user of user device 104 (e.g., via a chat service on user device 104, as described herein). Additionally or alternatively, NLP system 102 may communicate the selection of the time period to merchant system 108 (e.g., in a message similar to the initial request message to schedule the appointment).

In some non-limiting embodiments, NLP system 102 may receive user data associated with the user from user device 104. For example, the user data may include user identification data associated with an identification of the user. Additionally or alternatively, the user data may include account identification data associated with an account identifier of a payment account of the user. In some non-limiting embodiments, NLP system 102 may store a profile associated with the user of user device 104 based on the user data. For example, NLP system 102 may store the account identification data in association with the user identification data (e.g., at a time of enrollment of the user), and NLP system 102 may retrieve the account identification data upon receipt of user identification data from user device 104 (e.g., at a subsequent time after such storage).

In some non-limiting embodiments, a payment transaction may be initiated. For example, NLP system 102 may initiate a payment transaction between the selected merchant (e.g., of merchant system 108) and the user of user device 104 before reserving the resource. In some non-limiting embodiments, NLP system 102 may receive account identification data from user device 104 and/or retrieve the account identification data from the profile of the user of user device 104 (e.g., in response to receiving user identification data from user device 104). Additionally or alternatively, NLP system 102 may receive merchant identification data from merchant system 108. In some non-limiting embodiments, NLP system 102 may communicate the account identification data and merchant identification to transaction service provider system 106 to authorize the payment transaction. Additionally or alternatively, NLP system 102 may receive an indication from transaction service provider system 106 that the payment transaction is authorized.

FIGS. 4A-4D are diagrams of an overview of a non-limiting embodiment of an implementation 400 relating to process 300 shown in FIG. 3. As shown in FIGS. 4A-4D, implementation 400 may include natural language processing (NLP) system 402, user device 404, and merchant system 408. In some non-limiting embodiments, NLP system 402 may be the same or similar to NLP system 102, user device 404 may be the same as or similar to user device 104, and/or merchant system 408 may be the same or similar to merchant system 108 as described above.

Figure 4A:
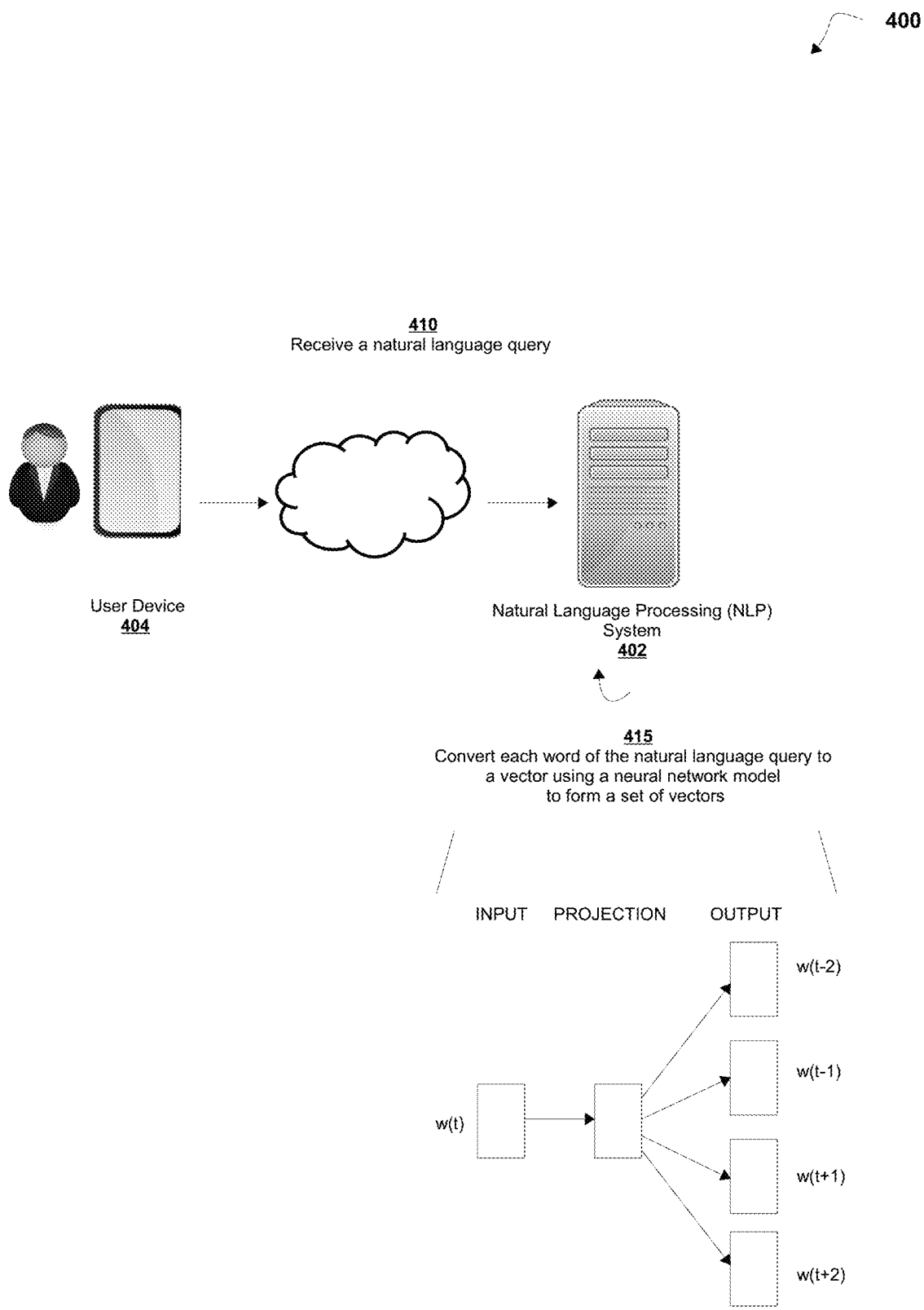
FIGS. 4A-4D are diagrams of an implementation of a non-limiting embodiment of the process shown in FIG. 3.

As shown by reference number 410 in FIG. 4A, NLP system 402 may receive a natural language query from user device 404. For example, NLP system 402 may receive a natural language query from user device 404 that includes one or more words associated with a merchant (e.g., one or more words that correspond to one or more words in a profile of a merchant).

As further shown by reference number 415 in FIG. 4A, NLP system 402 may convert each word of the natural language query to a vector using a neural network model to form a set of vectors. For example, as shown in FIG. 4A, for an input word, $w(t)$, to a neural network model, NLP system 402 may determine a vector representation of the input word, where each value of the vector representation is associated with a probability that another word in a vocabulary (e.g., $w(t-2)$, $w(t-1)$, $w(t+1)$, and $w(t+2)$ as shown in FIG. 4A) will be in context with the input word. NLP system 402 may use the following equation for average log probability, where m is the radius of the context, T is the number of words in the vocabulary, and $w_t$ is the center word (e.g., w(t), the input word):

$$J(\theta) = \frac{1}{T}\sum_{t=1}^{T}\sum_{-m \leq j \leq m, j \neq 0} \log p(w_{t+j} | w_t).$$

Figure 4B:
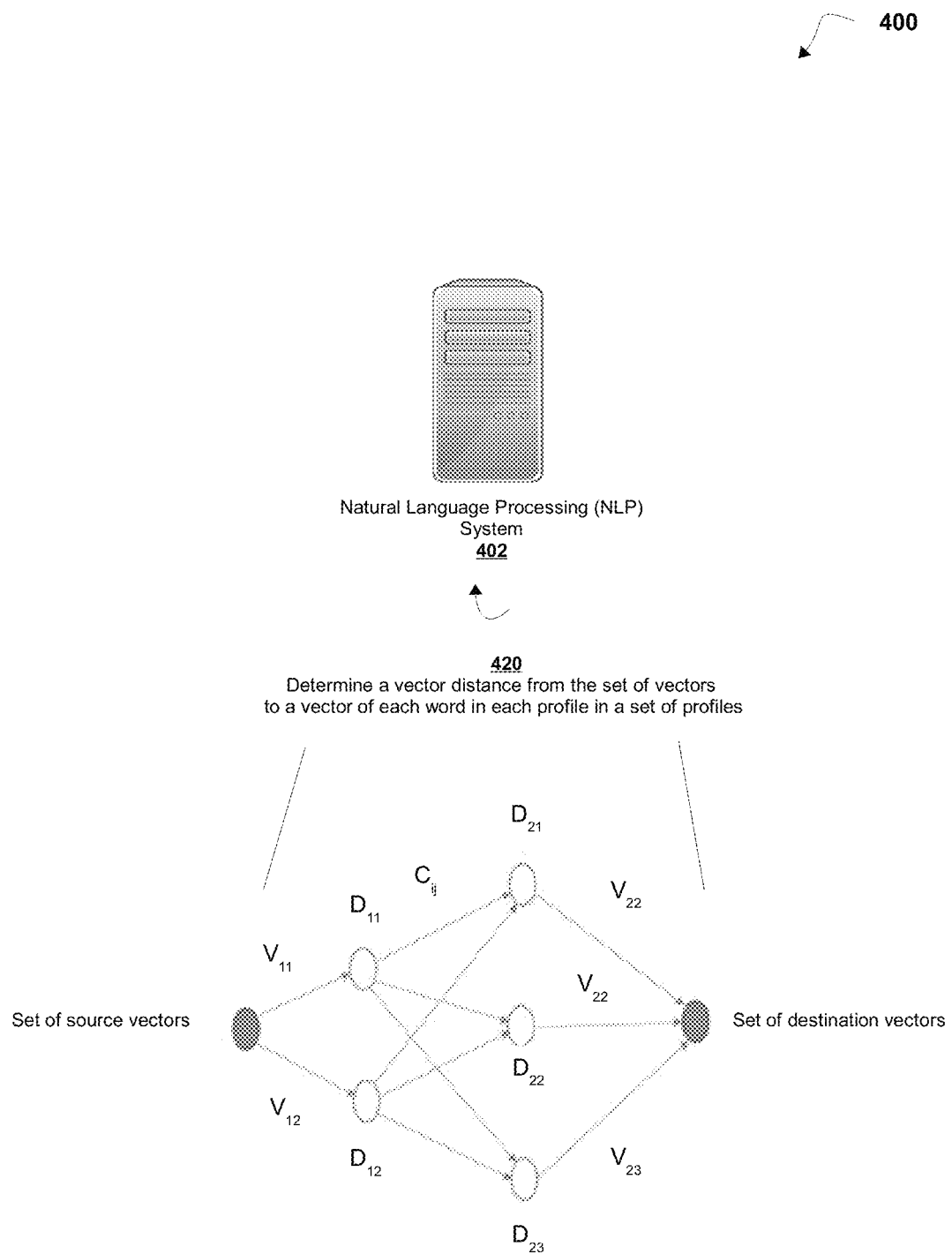

As shown by reference number 420 in FIG. 4B, NLP system 402 may determine a vector distance from a vector (e.g., a source vector) of the set of vectors to a vector (e.g., a destination vector) of each word in each profile in a set of profiles. For example, NLP system 402 may determine a Euclidean distance from each source vector to each destination vector. As shown in reference number 420 in FIG. 4B, the Euclidean distance between a source vector, $D_{11}$ or $D_{12}$, of a set of source vectors and a destination vector, $D_{21}$, $D_{22}$, or $D_{23}$, of a set of destination vectors is a transformation cost between a source vector and a destination vector (e.g., $D_{11}$ to $D_{21}$, $D_{11}$ to $D_{22}$, $D_{11}$ to $D_{23}$, $D_{12}$ to $D_{21}$, $D_{12}$ to $D_{22}$, or $D_{12}$ to $D_{23}$).

In some non-limiting embodiments, NLP system 402 may determine the Euclidean distance based on the following equation to determine the minimum transformation cost to transform one or more words of a national language query to each profile of the set of profiles, $$\min_{T \geq 0} \sum_{i=1}^{n}\sum_{j=1}^{n} T_{ij}c(i, j)$$

$$\text{Subject to: } \sum_{j=1}^{n} T_{ij} = W_{1i}$$

$$\sum_{i=1}^{n} T_{ij} = W_{2j}$$

where $T \in R^{n \times n}$ may be a spare flow matrix where $T_{ij} \geq 0$ denotes how much of word i in $D_{11}$ travels to word j in $D_{22}$. To transform $D_{11}$ entirely into $D_{22}$, it needs to be ensured that the entire outgoing flow from word i equals $W_{1i}$ (e.g., the weight of word i in $D_{11}$), i.e., $\Sigma_j T_{ij} = W_{1i}$. Further, the amount of incoming flow to word j should match $W_{2i}$ (e.g., the weight of word j in $D_{22}$), i.e., $\Sigma_j T_{ij} = W_{2i}$. The distance between the natural language query and each profile of the set of profiles can then be defined as a minimum cumulative cost required to move all words from the natural language query to a respective profile of the set of profiles. The similarity between the natural language query and each profile is inversely proportional to the minimum transformation cost therebetween. Additionally or alternatively, based on a size difference between a size of the natural language query and each profile of the set of profiles, the following equation may be used where the second constraint has been removed:

$$\min_{T \geq 0} \sum_{i=1}^{n}\sum_{j=1}^{n} T_{ij}c(i, j)$$

$$\text{Subject to: } \sum_{j=1}^{n} T_{ij} = W_{1i}$$

The equation above ensures that the entire weight of the natural language search query flows into each profile of the set of profiles without requiring all of the weight of each profile to flow back into the natural language search query. In some non-limiting embodiments, the weights of the words in the natural language search query or the weights of the words in each profile of the set of profiles is a count of a number of words in the natural language search query or a count of a number of words in each profile, respectively.

Figure 4C:
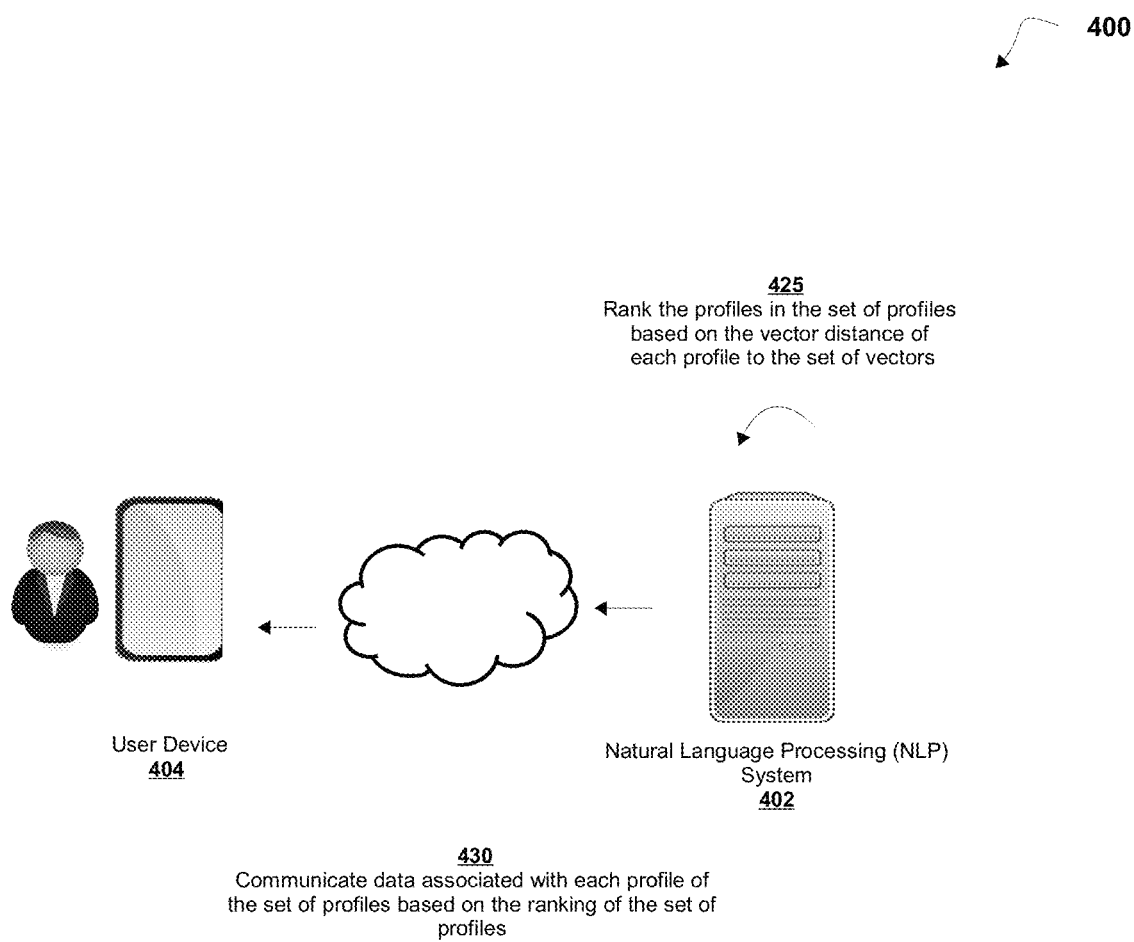

As shown by reference number 425 in FIG. 4C, NLP system 402 may rank the profiles in the set of profiles based on the vector distance of each profile to the set of vectors. As further shown by reference number 430 in FIG. 4B, NLP system 402 may communicate data associated with each profile of the set of profiles based on the ranking of the set of profiles. For example, NLP system 402 may communicate merchant data associated with a merchant for each profile of the set of profiles in order of the ranking of the set of profiles.

Figure 4D:
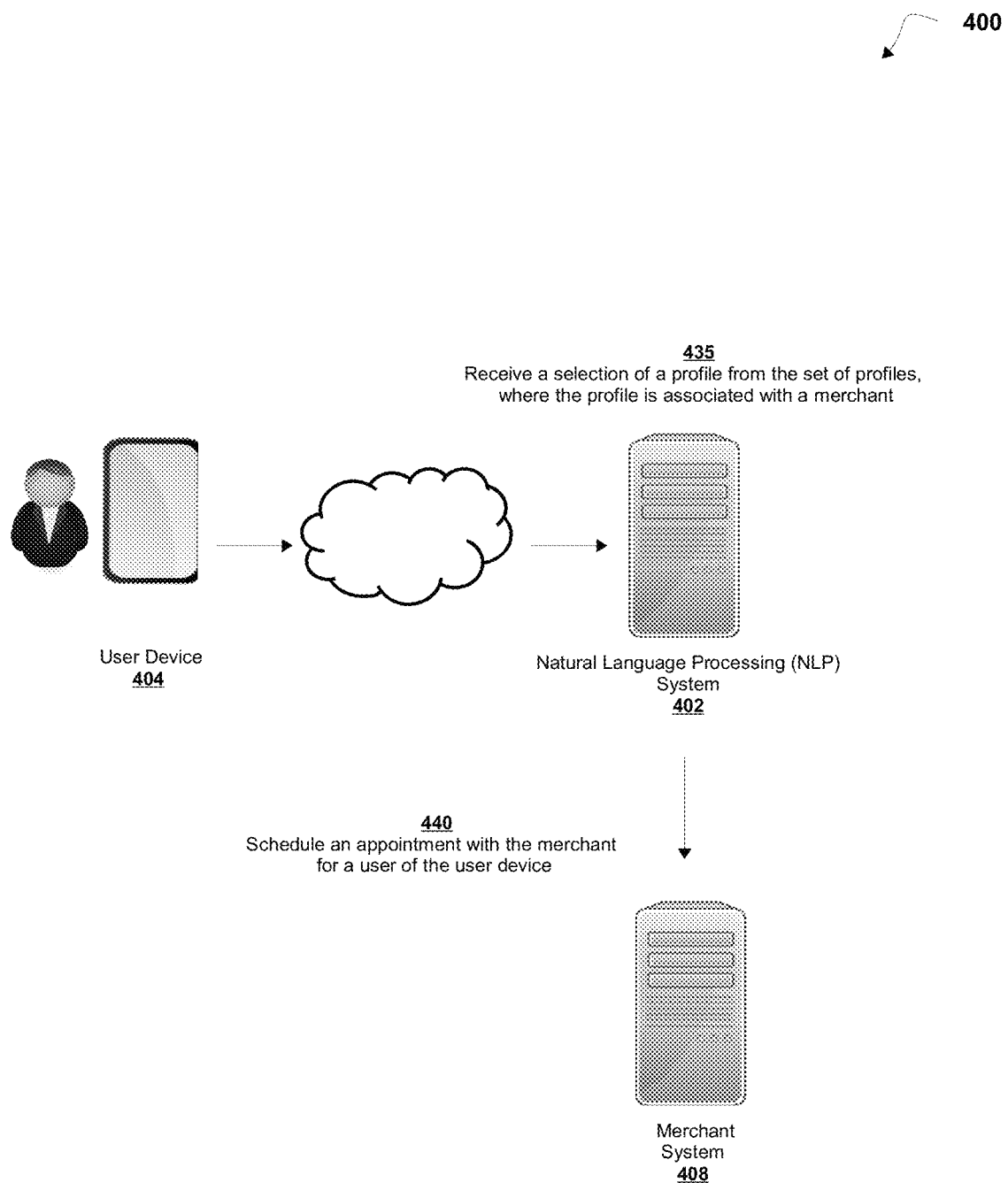

As shown by reference number 435 in FIG. 4D, NLP system 402 may receive a selection of a profile from the set of profiles from user device 404, where the profile is associated with a merchant. For example, NLP system 402 may receive a selection of a profile from the set of profiles from user device 404 after NLP system 402 communicates the merchant data associated with a merchant (e.g., a merchant associated with merchant system 408) for each profile of the set of profiles.

As further shown by reference number 440 in FIG. 4D, NLP system 402 may schedule an appointment with the merchant for a user of user device 404. For example, NLP system 402 may schedule the appointment with the merchant associated with merchant system 408 for the user of user device 404 by communicating a scheduling message to merchant system 408 that automatically schedules the appointment with the merchant.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. For example, it is to be understood that the present invention contemplates that, to the extent possible, one or more features of any embodiment can be combined with one or more features of any other embodiment.

The invention claimed is:

1. A natural language processing (NLP) system for determining a merchant based on a natural language query, comprising:
    at least one processor programmed or configured to:
        receive a natural language query from a user device, the natural language query comprising at least one word;
        convert the at least one word of the natural language query to a vector using at least one neural network to form a set of vectors;
        determine a vector distance from the set of vectors to each profile in a set of profiles, each profile associated with a merchant;
        rank each profile in the set of profiles based on the vector distance of each profile to the set of vectors;
        communicate merchant data associated with at least one merchant included in the set of profiles to the user device, wherein the merchant data is communicated based on the rank of the set of profiles;
        receive a selection of a first merchant associated with the merchant data from the user device; and schedule an appointment with the first merchant for a user of the user device; and wherein the at least one word of the natural language query is at least one first word, wherein the set of vectors is a first set of vectors, wherein each profile in the set of profiles comprises data associated with the merchant, the data associated with the merchant comprising at least one second word, wherein each profile is associated with a second set of vectors comprising at least one second vector associated with the at least one second word, and wherein, when determining the vector distance from the first set of vectors to each profile in the set of profiles, the at least one processor is programmed or configured to:

determine the vector distance from the first set of vectors to each profile in the set of profiles based on a Euclidean distance from at least one first vector of the first set of vectors to the at least one second vector of the second set of vectors.

2. The NLP system of claim 1, wherein, when receiving the natural language query, the at least one processor is programmed or configured to:

receive the natural language query from a chat client on the user device.

3. The NLP system of claim 2, wherein, when communicating the merchant data associated with each merchant included in the set of profiles, the at least one processor is programmed or configured to:

communicate a message to the chat client on the user device, the message comprising a list of each merchant associated with a subset of the set of profiles based on the ranking of each profile.

4. The NLP system of claim 1, wherein the vector distance comprises a minimum transformation cost to transform each vector of the first set of vectors to each vector of the second set of vectors according to the formula:

$$\min_{T \geq 0} \sum_{i=1}^{n} \sum_{j=1}^{n} T_{ij} c(i, j)$$

$$\text{Subject to: } \sum_{j=1}^{n} T_{ij} = W_{1i}.$$

where $T_{ij}$ is a transformation cost function of the Euclidean distance, c(i, j), between a vector i in the first set of vectors to a corresponding vector j in the second set of vectors, and where $W_{1i}$ is the weight of vector i in the first set of vectors.

5. The NLP system of claim 1, wherein, when ranking each profile in the set of profiles, the at least one processor is programmed or configured to:

rank the profiles in the set of profiles based on at least one of:
  a distance of a location of a merchant associated with a profile from the user device;
  an offer being provided by a merchant associated with a profile;
  a review rating of a merchant associated with a profile;
  a size of a merchant associated with a profile; or
  any combination thereof.

6. The NLP system of claim 1, further comprising:

determining a subset of the set of profiles based on the vector distance of each of the profiles to the set of vectors, wherein, when communicating the merchant data associated with each merchant included in the set of profiles to the user device, the at least one processor is programmed or configured to:

communicate the merchant data associated with each merchant included in the subset of profiles to the user device.

7. A computer program product for determining a merchant based on a natural language query, the computer program product comprising at least one non-transitory computer-readable medium including one or more instructions that, when executed by at least one processor, cause the at least one processor to:

receive a natural language query from a user device, the natural language query comprising at least one word;

convert the at least one word of the natural language query to a vector using at least one neural network to form a set of vectors;

determine a vector distance from the set of vectors to each profile in a set of profiles, each profile associated with a merchant;

rank each profile in the set of profiles based on the vector distance of each profile to the set of vectors;

communicate merchant data associated with at least one merchant included in the set of profiles to the user device, wherein the merchant data is communicated based on the rank of the set of profiles;

receive a selection of a first merchant associated with the merchant data from the user device; and schedule an appointment with the first merchant for a user of the user device; and wherein the at least one word of the natural language query is at least one first word, wherein the set of vectors is a first set of vectors, wherein each profile in the set of profiles comprises data associated with the merchant, the data associated with the merchant comprising at least one second word, wherein each profile is associated with a second set of vectors comprising at least one second vector associated with the at least one second word, and wherein the one or more instructions that cause the at least one processor to determine the vector distance from the first set of vectors to each profile in the set of profiles, cause the at least one processor to:

determine the vector distance from the first set of vectors to each profile in the set of profiles based on a Euclidean distance from at least one first vector of the first set of vectors to the at least one second vector of the second set of vectors.

8. The computer program product of claim 7, wherein the one or more instructions that cause the at least one processor to receive the natural language query, cause the at least one processor to:

receive the natural language query from a chat client on the user device.

9. The computer program product of claim 8, wherein the one or more instructions that cause the at least one processor to communicate the merchant data associated with the merchant included in the set of profiles, cause the at least one processor to:

communicate a message to the chat client on the user device, the message comprising a list of each merchant associated with a subset of the set of profiles based on the ranking of each profile.

10. The computer program product of claim 7, wherein the vector distance comprises a minimum transformation cost to transform each vector of the first set of vectors to each vector of the second set of vectors according to the formula:

$$\min_{T \geq 0} \sum_{i=1}^{n} \sum_{j=1}^{n} T_{ij} c(i, j)$$

$$\text{Subject to: } \sum_{j=1}^{n} T_{ij} = W_{1i}.$$

where $T_{ij}$ is a transformation cost function of the Euclidean distance, $c(i, j)$, between a vector i in the first set of vectors to a corresponding vector j in the second set of vectors, and where $W_{1i}$ is the weight of vector i in the first set of vectors.

11. The computer program product of claim 7, wherein the one or more instructions that cause the at least one processor to rank each profile in the set of profiles, cause the at least one processor to:
rank the profiles in the set of profiles based on at least one of:
a distance of a location of a merchant associated with a profile from the user device;
an offer being provided by a merchant associated with a profile;
a review rating of a merchant associated with a profile;
a size of a merchant associated with a profile; or
any combination thereof.

12. The computer program product of claim 7, further comprising:
determining a subset of the set of profiles based on the vector distance of each of the profiles to the set of vectors,
wherein, when communicating the merchant data associated with each merchant included in the set of profiles to the user device, the at least one processor is programmed or configured to:
communicate the merchant data associated with each merchant included in the subset of profiles to the user device.

13. A method for determining a merchant based on a natural language query, comprising:
receiving, with at least one processor, a natural language query from a user device, the natural language query comprising at least one word;
converting, with the at least one processor, the at least one word of the natural language query to a vector using at least one neural network to form a set of vectors;
determining, with the at least one processor, a vector distance from the set of vectors to each profile in a set of profiles, each profile associated with a merchant;
ranking, with the at least one processor, each profile in the set of profiles based on the vector distance of each profile to the set of vectors;
communicating, with the at least one processor, merchant data associated with each merchant included in the set of profiles to the user device, wherein the merchant data is communicated based on ranking each profile in the set of profiles;
receiving, with the at least one processor, a selection of a first merchant associated with the merchant data from the user device; and
scheduling, with the at least one processor, an appointment with the first merchant for a user of the user device; and wherein the at least one word of the natural language query is at least one first word, wherein the set of vectors is a first set of vectors, wherein each profile in the set of profiles comprises a description of the merchant, the data associated with the merchant comprising at least one second word, wherein each profile is associated with a second set of vectors comprising at least one second vector associated with the at least one second word, and wherein determining the vector distance from the first set of vectors to each profile in the set of profiles comprises:
determining the vector distance from the first set of vectors to each profile in the set of profiles based on a Euclidean distance from at least one first vector of the first set of vectors to the at least one second vector of the second set of vectors.

14. The method of claim 13, wherein the vector distance comprises a minimum transformation cost to transform each vector of the first set of vectors to each vector of the second set of vectors according to the formula:

$$\min_{T \geq 0} \sum_{i=1}^{n} \sum_{j=1}^{n} T_{ij} c(i, j)$$

$$\text{Subject to: } \sum_{j=1}^{n} T_{ij} = W_{1i}.$$

where $T_{ij}$ is a transformation cost function of the Euclidean distance, $c(i, j)$, between a vector i in the first set of vectors to a corresponding vector j in the second set of vectors, and where $W_{1i}$ is the weight of vector i in the first set of vectors.

15. The method of claim 13, further comprising:
training the neural network based on a second set of profiles before converting the at least one word of the natural language query.

16. The method of claim 15, wherein the neural network comprises a skip-gram model with an input layer, an output layer, and at least one hidden layer connecting the input layer to the output layer, and wherein training the neural network comprises:
iteratively providing a third word of the second set of profiles to the input layer; and
comparing outputs of the output layer to a plurality of words of the second set of profiles, wherein the plurality of words are adjacent the third word.

17. The method of claim 13, further comprising:
initiating a payment transaction between the merchant and the user of the user device before scheduling the appointment;
receiving user data associated with the user from the user device, the user data comprising user identification data associated with an identification of the user and account identification data associated with an account identifier of a payment account of the user; and
storing a profile associated with the user of the user device based on the user data, wherein initiating the payment transaction comprises:
communicating the account identification data from the profile and merchant identification data associated with the merchant to a transaction service provider system to authorize the payment transaction; and
receiving an indication from the transaction service provider system that the payment transaction is authorized.

* * * * *